(12) United States Patent
Ho et al.

(10) Patent No.: US 11,336,394 B2
(45) Date of Patent: May 17, 2022

(54) RECEIVER DEVICE, RECEIVER SYSTEM, AND OPERATION METHOD

(71) Applicant: Realtek Semiconductor Corporation, Hsinchu (TW)

(72) Inventors: Chun-Hung Ho, Hsinchu (TW); Yan-Cheng Wang, Hsinchu (TW); Chang-Ming Lee, Hsinchu (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 18 days.

(21) Appl. No.: 17/035,982

(22) Filed: Sep. 29, 2020

(65) Prior Publication Data
US 2021/0266104 A1     Aug. 26, 2021

(30) Foreign Application Priority Data
Feb. 25, 2020 (TW) ................. 109106104

(51) Int. Cl.
*H04L 1/00* (2006.01)
*H04L 5/00* (2006.01)

(52) U.S. Cl.
CPC .......... *H04L 1/0083* (2013.01); *H04L 1/0041* (2013.01); *H04L 1/0071* (2013.01); *H04L 5/0053* (2013.01)

(58) Field of Classification Search
CPC ... H04L 1/0041; H04L 1/0034; H04L 1/0045; H04L 1/0071; H04L 1/0083; H04L 5/0053
See application file for complete search history.

(56) References Cited

U.S. PATENT DOCUMENTS

| | | | |
|---|---|---|---|
| 8,441,927 B2 | 5/2013 | Francini | |
| 9,485,195 B2 | 11/2016 | Swartzentruber et al. | |
| 2003/0039220 A1* | 2/2003 | Kwak | H04L 1/0034 370/320 |
| 2003/0058795 A1 | 3/2003 | Lansing et al. | |
| 2003/0206559 A1 | 11/2003 | Trachewsky et al. | |
| 2018/0152264 A1* | 5/2018 | Kilian | H04L 1/0045 |

* cited by examiner

*Primary Examiner* — Shelly A Chase
(74) *Attorney, Agent, or Firm* — Locke Lord LLP; Tim Tingkang Xia, Esq.

(57) ABSTRACT

A receiver device is configured to receive a packet. The receiver device includes a physical layer circuit. The physical layer circuit is configured to demodulate the packet to acquire at least one indicator associated with the packet, and determine whether the packet is an abnormal packet or not according to the at least one indicator. If the packet is the abnormal packet, the physical layer circuit drops the packet.

17 Claims, 4 Drawing Sheets

RECEIVER DEVICE, RECEIVER SYSTEM, AND OPERATION METHOD

RELATED APPLICATIONS

This application claims priority to Taiwanese Application Serial Number 109106104, filed Feb. 25, 2020, which is herein incorporated by reference.

BACKGROUND

Technical Field

The present disclosure relates to a method for dropping a packet. More particularly, the present disclosure relates to a receiver device, a receiver system, and an operation method.

Description of Related Art

With development of technology, electrical devices have been applied to various fields. Two of the electrical devices can transmit/receive data by the communication technology.

In some related approaches, when a receiver device receives a packet, the packet is processed by a physical layer circuit of the receiver circuit first. Then, the physical layer circuit transmits the processed packet to a medium access control (MAC) layer circuit of the receiver circuit. Then, the MAC layer circuit determines whether a packet drop process is performed or not. However, this needs more processing time.

SUMMARY

Some aspects of the present disclosure are to provide a receiver device. The receiver device is configured to receive a packet. The receiver device includes a physical layer circuit. The physical layer circuit is configured to demodulate the packet to acquire at least one indicator associated with the packet, and determine whether the packet is an abnormal packet or not according to the at least one indicator. If the packet is the abnormal packet, the physical layer circuit drops the packet.

Some aspects of the present disclosure are to provide a receiver system. The receiver system includes a first receiver device and a second receiver device. The first receiver device includes a first physical layer circuit. The first physical layer circuit is configured to receive and demodulate a packet from a transmitter device, to acquire a first value of at least one indicator associated with the packet. The second receiver device comprising a second physical layer circuit. The second physical layer circuit is configured to receive and demodulate the packet, to acquire a second value of the at least one indicator associated with the packet. Based on the first value and the second value, it is determined whether the packet is an abnormal packet or not. If the packet is the abnormal packet, the first physical layer circuit and the second physical layer circuit drop the packet.

Some aspects of the present disclosure are to provide an operation method. The operation method includes the following steps: receiving a packet by a receiver device; demodulating the packet to acquire at least one indicator associated with the packet by a physical layer circuit of the receiver device; determining whether the packet is an abnormal packet or not according to the at least one indicator by the physical layer circuit; and dropping the packet by the physical layer circuit if the packet is the abnormal packet.

Based on the descriptions above, the receiver device, the receiver system, and the operation method of the present disclosure can utilize the physical layer circuit to drop the abnormal packet, to save processing time.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
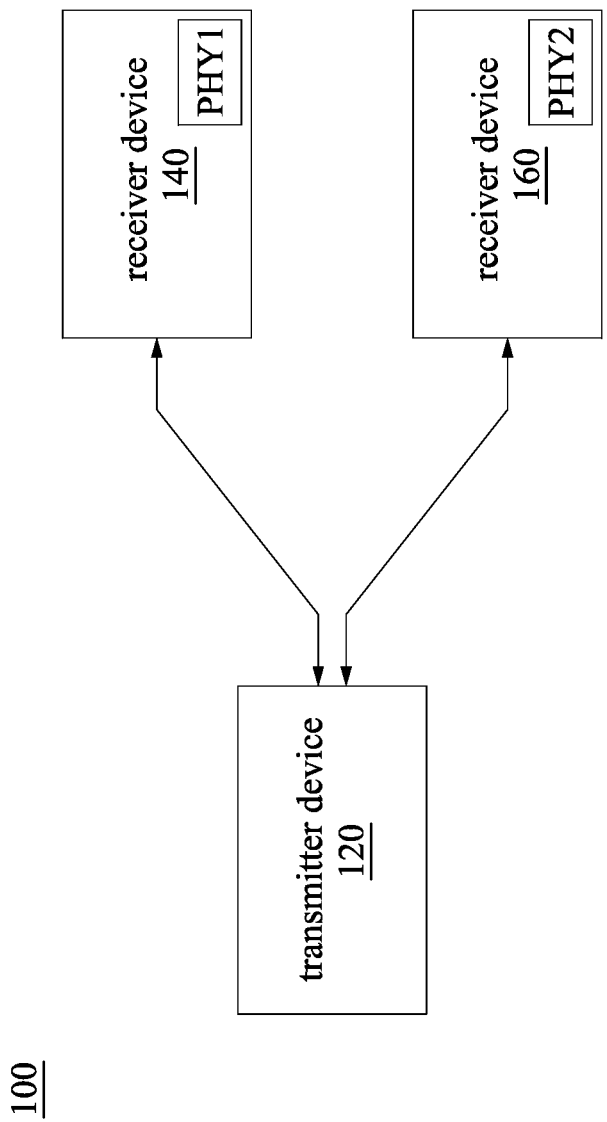
FIG. 1 is a schematic diagram illustrating a communication system according to some embodiments of the present disclosure.

Reference is now made in detail to the present embodiments of the disclosure, examples of which are illustrated in the accompanying drawings. Wherever possible, the same reference numbers are used in the drawings and the description to refer to the same or like parts. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure.

In the present disclosure, "connected" or "coupled" may refer to "electrically connected" or "electrically coupled." "Connected" or "coupled" may also refer to operations or actions between two or more elements.

Reference is made to FIG. 1. FIG. 1 is a schematic diagram illustrating a communication system 100 according to some embodiments of the present disclosure. As illustrated in FIG. 1, the communication system 100 includes a transmitter device 120, a receiver device 140, and the receiver device 160. In some embodiments, the transmitter device 120 transmits data to the receiver device 140 and the receiver device 160 by a communication technology. The communication technology is, for example, a wire communication technology or a wireless communication technology. The wireless communication technology is, for example, Wireless Fidelity (Wi-Fi), but the present disclosure is not limited thereto.

The quantity of the transmitter device and the quantity of the receiver device in FIG. 1 are for illustration, and various quantities of the transmitter device and various quantities of the receiver device are within the contemplated scopes of the present disclosure.

The receiver device 140 is taken as an example. In operation, the transmitter device 120 can send a packet to the receiver device 140, to transmit data to the receiver device 140. However, during the transmission, data may be suffered by interference, and thus the packet is distorted.

In some related approaches, when a receiver device receives a packet, the packet is processed by a physical layer circuit of the receiver circuit first. Then, the physical layer circuit transmits the processed packet to a medium access control (MAC) layer circuit of the receiver circuit. Then, the MAC layer circuit determines whether a packet drop process is performed or not. When the packet is dropped, the receiver device does not perform subsequent processing on the packet. However, this needs more processing time.

Compared to the related approaches, in the present disclosure, when the receiver device 140 receives the packet from the transmitter device 120, a physical layer circuit PHY1 of the receiver device 140 can determine whether to drop the packet or not. If the physical layer circuit PHY1 determines to drop the packet, the physical layer circuit PHY1 can perform the packet drop process, such that the physical layer circuit PHY1 does not waste too much time to process the packet, so as to directly process a next packet. In some embodiments, the receiver device 160 has the same operations. In other words, when the receiver device 160 receives a packet from the transmitter device 120, a physical layer circuit PHY2 of the receiver device 160 can determine whether to drop the packet or not. If the physical layer circuit PHY2 determines to drop the packet, the physical layer circuit PHY2 can perform the packet drop process. Since the packet drop process is performed by the physical layer circuits (not MAC layer circuit of the receiver device 140 or the receiver device 160), it can prevent the receiver device 140 (or the receiver device 160) from wasting too much time to process the distorted packet caused by interference.

Figure 2:
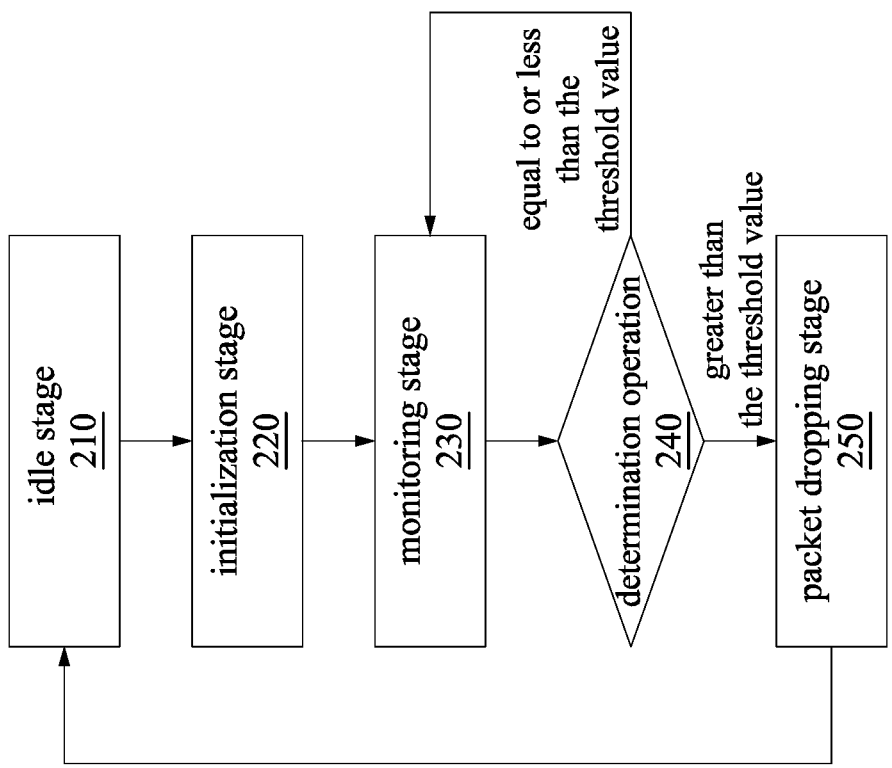
FIG. 2 is a schematic diagram illustrating multiple processing stages of a receiver device according to some embodiments of the present disclosure.

Reference is made to FIG. 2. FIG. 2 is a schematic diagram illustrating multiple processing stages of the receiver device 140 according to some embodiments of the present disclosure. The receiver device 160 has similar operations, so they are not described herein again. As illustrated in FIG. 2, the process to determine whether to drop the packet includes an idle stage 210, an initialization stage 220, a monitoring stage 230, a determination operation 240, and a packet dropping stage 250.

Figure 3:
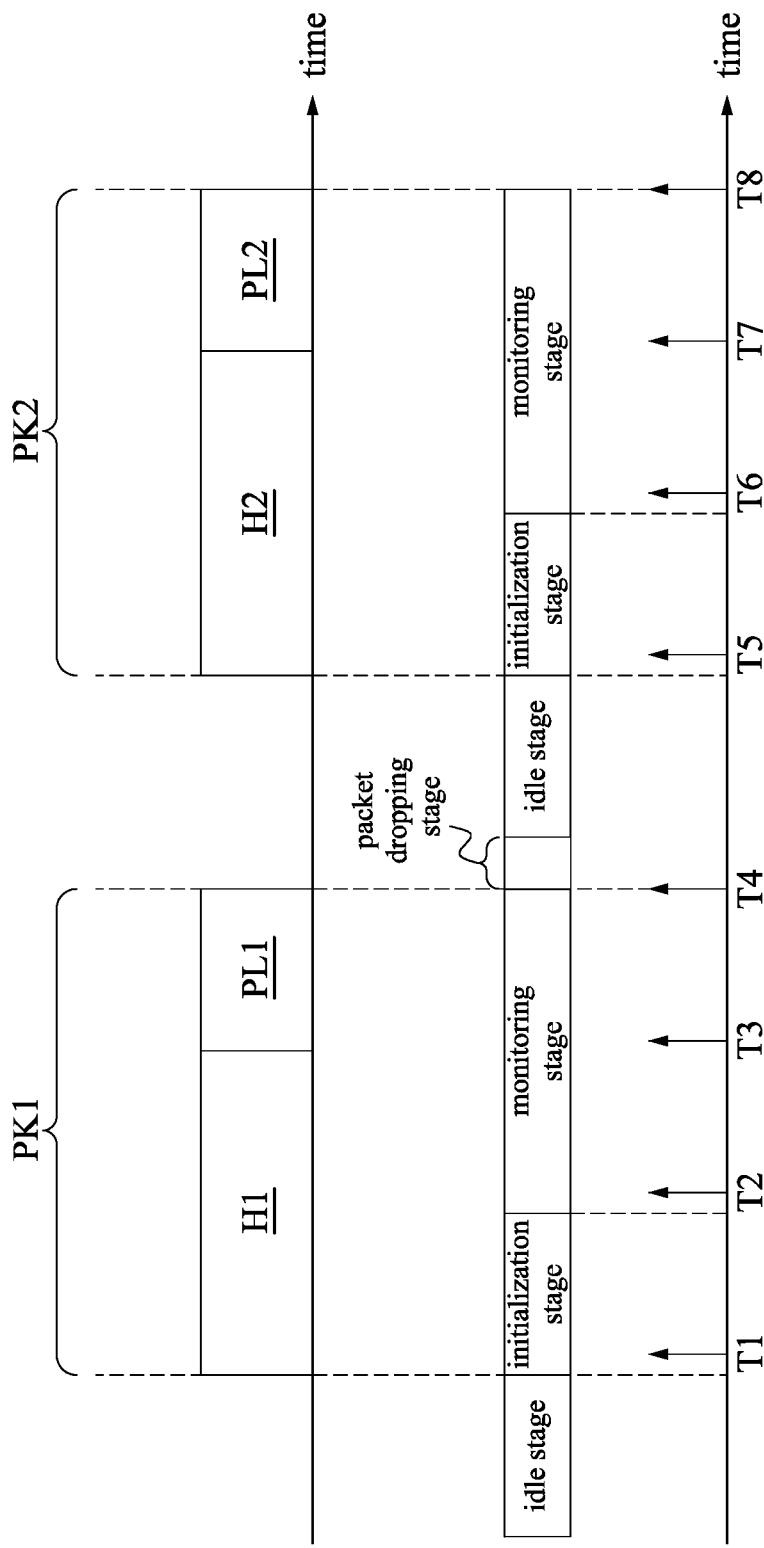
FIG. 3 is a detailed diagram illustrating multiple processing stages in FIG. 2 according to some embodiments of the present disclosure.

Operations of the stages are described in the following paragraphs. References are made to FIG. 1-FIG. 3. FIG. 3 is a detailed diagram illustrating multiple processing stages in FIG. 2 according to some embodiments of the present disclosure.

As illustrated in FIG. 3, FIG. 3 includes timing T1-T8. The transmitter device 120 sends a packet PK1 and a packet PK2 sequentially. The packet PK1 includes a header filed H1 and a payload filed PL1. Similarly, the packet PK2 includes a header filed H2 and a payload filed PL2. The quantity of the packets in FIG. 3 is for illustration, and various quantities of the packets are within the contemplated scopes of the present disclosure.

Before the receiver device 140 receives any packet, the receiver device 140 is at the idle stage 210. In some embodiments, when the receiver device 140 is idle, related hardware is powered down, to save power.

When the receiver device 140 receives the packet PK1, the receiver device 140 performs a clean channel assessment (CCA) on the packet PK1. After the packet PK1 passes the clean channel assessment, the receiver device 140 changes to the initialization stage 220 from the idle stage 210. In the initialization stage 220, the physical layer circuit PHY1 demodulates the packet PK1 to acquire an indicator associated with the packet PK1. The indicator is, for example, a received signal strength indication (RSSI) of the packet PK1, a carrier frequency offset (CFO) of the packet PK1, a signal-to-noise ratio (SNR) of the packet PK1, a summation value of Barker code of the packet PK1, an error vector magnitude (EVM) of the packet PK1, or a guard interval of the packet PK1. The indicators above are for illustration, and various indicators are within the contemplated scopes of the present disclosure. For example, the physical layer circuit PHY1 demodulates the header filed H1 of the packet PK1, to acquire a first value of the RSSI of the packet PK1 corresponding to the timing T1.

In the monitoring stage 230, the physical layer circuit PHY1 continues to demodulate the packet PK1 to acquire a second value of the RSSI of the packet PK1 corresponding to the timing T2.

In the determination operation 240, the physical layer circuit PHY1 determines whether the packet PK1 is the abnormal packet or not according to the indicator. For example, the physical layer circuit PHY1 calculates a difference between the second value and the first value, and compares the difference with a first threshold value (for example, a RSSI threshold value), to determine whether the packet PK1 is the abnormal packet or not. For example, if the difference is equal to or less than the first threshold value, the physical layer circuit PHY1 determines that the packet PK1 is a normal packet, and the physical layer circuit PHY1 is back to the monitoring stage 230. Alternately, if the difference is greater than the first threshold value, the physical layer circuit PHY1 determines that the packet PK1 is an abnormal packet. Then, the packet dropping stage 250 is entered.

In the packet dropping stage 250, the physical layer circuit PHY1 drops the packet PK1 and stops performing clean channel assessment. Then, the receiver device 140 is back to the idle stage 210 and waits to receive a packet (for example, the packet PK2). Explained in another way, if the RSSI values corresponding to different timing are changed drastically, it indicates that the packet PK1 may be interfered and distorted. Therefore, the physical layer circuit PHY1 drops the packet PK1 and does not continue to process the packet PK1, to save processing time. If the RSSI values corresponding to different timing are not changed drastically, it indicates that the packet PK1 is not distorted or the distortion degree of the packet PK1 is smaller. Therefore, the physical layer circuit PHY1 continues to process the packet PK1.

In some embodiments, the physical layer circuit PHY1 monitors the indicator of the packet PK1 continually and periodically. For example, if the physical layer circuit PHY1 determines that the packet PK1 is the normal packet, the physical layer circuit PHY1 continues to demodulate the packet PK1 to acquire a third value of the indicator corresponding to the timing T3. Then, the physical layer circuit PHY1 calculates a difference value between the third value and the second value, and compares the difference value with the aforementioned first threshold value, to determine whether the packet PK1 is still the normal packet. Similarly, if the difference value is greater than the first threshold value, the physical layer circuit PHY1 determines that the packet PK1 is the abnormal packet and drops the packet PK1 at the packet dropping stage 250. If the difference value is equal to or less than the first threshold value, the physical layer circuit PHY1 determines that the packet PK1 is still the normal packet.

In some other embodiments, the physical layer circuit PHY1 further calculates a difference value between the aforementioned third value and the aforementioned first value, and compares the difference value with a second threshold value, to determine whether the packet PK1 is still the normal packet or not. In other words, in these embodiments, difference value between the first value and each of the subsequent acquired values is utilized to determine whether the packet PK1 is still the normal packet, and the threshold value is adjusted to be higher gradually. In some embodiments, the second threshold value is greater than the first threshold value. For example, in a condition that the difference value between the aforementioned second value and the aforementioned first value is determined to be equal to or less than the first threshold value, if the difference value between the aforementioned third value and the aforementioned first value is greater than the second threshold value, the physical layer circuit PHY1 determines that the packet PK1 is the abnormal packet and drops the packet PK1 at the packet dropping stage 250. Alternately, if the difference value between the aforementioned third value and the aforementioned first value is equal to or less than the second threshold value, the physical layer circuit PHY1 determines that the packet PK1 is still the normal packet.

The packet PK2 and the related timing T5-T8 have similar operations, so they are not described herein again.

Reference is made to FIG. 1 again. The receiver device 140 and the receiver device 160 form a receiving system, and receive the same packet from the transmitter device 120. In some embodiments, each of the receiver device 140 and the receiver device 160 may be implemented by an antenna separately. The physical layer circuit PHY1 of the receiver device 140 can demodulate this packet, to acquire a first value of an indicator associated with this packet. The physical layer circuit PHY2 of the receiver device 160 also can demodulate this packet, to acquire a second value of the indicator associated with this packet. Based on the first value and the second value, it can be determined whether this packet is an abnormal packet or not. In other words, in these embodiments, the indicator differences between different receiver devices (for example, different antennas) are utilized to determine whether this packet is still a normal packet. For example, if a difference value between the first value acquired by the receiver device 140 and the second value acquired by the receiver device 160 is greater than a third threshold value, this packet is determined to be the normal packet.

In some other embodiments, if the aforementioned first value or the aforementioned second value is less than a fourth threshold value, this packet is determined to be an abnormal packet. For example, if the RSSI value (first value) acquired by the physical layer circuit PHY1 is almost 0, it indicates that this packet may be interfered during the packet transmission procedure, and thus this packet is determined to be the abnormal packet. In this situation, the physical layer circuit PHY1 and the physical layer circuit PHY2 drop this packet.

Figure 4:
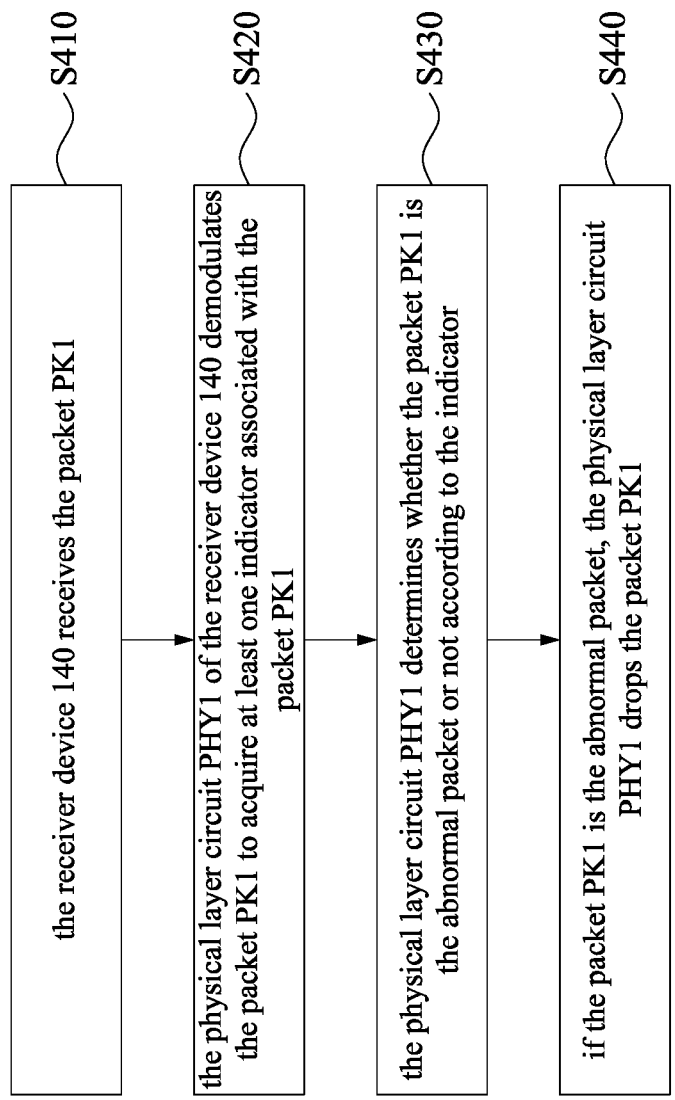
FIG. 4 is a flow diagram illustrating an operation method according to some embodiments of the present disclosure.

Reference is made to FIG. 4. FIG. 4 is a flow diagram illustrating an operation method 400 according to some embodiments of the present disclosure. The operation method 400 includes an operation S410, an operation S420, an operation S430, and an operation S440.

In some embodiments, the operation method 400 is applied to the communication system 100 in FIG. 1, but the present disclosure is not limited thereto. For ease of understanding, the operation method 400 is discussed with FIG. 3 and the communication system 100 in FIG. 1.

In operation S410, the receiver device 140 receives the packet PK1. In some embodiments, the packet PK1 includes the header filed H1 and the payload filed PL1.

In operation S420, the physical layer circuit PHY1 of the receiver device 140 demodulates the packet PK1 to acquire at least one indicator associated with the packet PK1. In some embodiments, the physical layer circuit PHY1 can demodulate the header filed H1 of the packet PK1 to acquire the RSSI of the packet PK1 corresponding to the timing T1.

In operation S430, the physical layer circuit PHY1 determines whether the packet PK1 is the abnormal packet or not according to the indicator. In some conditions, the packet PK1 may be interfered by interference during the signal transmission procedure, such that the packet PK1 is distorted. In some embodiments, the physical layer circuit PHY1 can utilize values of the indicator at different timing to determine whether characteristic of the packet PK1 changes drastically or not.

In operation S440, if the packet PK1 is the abnormal packet, the physical layer circuit PHY1 drops the packet PK1, to prevent the receiver device 140 from wasting too much time to process the distorted packet.

The above description of the operation method 400 includes exemplary operations, but the operations of the operation method 400 are not necessarily performed in the order described. The order of the operations of the operation method 400 disclosed in the present disclosure are able to be changed, or the operations are able to be executed simultaneously or partially simultaneously as appropriate, in accordance with the spirit and scope of various embodiments of the present disclosure.

Based on the descriptions above, the receiver device, the receiver system, and the operation method of the present disclosure can utilize the physical layer circuit to drop the abnormal packet, to save processing time.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A receiver device configured to receive a packet, wherein the receiver device comprises:
 a physical layer circuit configured to demodulate the packet at a first timing to acquire a first value of at least one indicator associated with the packet, acquire a second value of the at least one indicator at a second timing, calculate a first difference value between the first value and the second value, and compare the first difference value with a first threshold value to determine whether the packet is an abnormal packet or not according to the at least one indicator, wherein if the packet is the abnormal packet, the physical layer circuit drops the packet.

2. The receiver device of claim 1, wherein if the first difference value is greater than the first threshold value, the physical layer circuit determines that the packet is the abnormal packet, wherein if the first difference value is equal to or less than the first threshold value, the physical layer circuit determines that the packet is a normal packet.

3. The receiver device of claim 1, wherein if the physical layer circuit determines that the packet is a normal packet, the physical layer circuit is further configured to acquire a third value of the at least one indicator at a third timing, calculate a second difference value between the third value and the second value, and compare the second difference value with the first threshold value, to determine whether the packet is still the normal packet or not.

4. The receiver device of claim 3, wherein if the second difference value is greater than the first threshold value, the physical layer circuit determines that the packet is the abnormal packet, wherein if the second difference value is equal to or less than the first threshold value, the physical layer circuit determines that the packet is still the normal packet.

5. The receiver device of claim 1, wherein if the physical layer circuit determines that the packet is a normal packet, the physical layer circuit is further configured to acquire a third value of the at least one indicator at a third timing, calculate a second difference value between the third value and the second value, and compare the second difference value with a second threshold value, to determine whether the packet is still the normal packet or not.

6. The receiver device of claim 5, wherein if the second difference value is greater than the second threshold value, the physical layer circuit determines that the packet is the abnormal packet, wherein if the second difference value is equal to or less than the second threshold value, the physical layer circuit determines that the packet is still the normal packet.

7. The receiver device of claim 1, wherein the at least one indicator comprises a received signal strength indication (RSSI), a carrier frequency offset (CFO), a signal-to-noise ratio (SNR), a summation value of Barker code, an error vector magnitude (EVM), or a guard interval.

8. The receiver device of claim 1, wherein the receiver device is applied to a wireless communication technology.

9. A receiver system, comprising:
a first receiver device comprising a first physical layer circuit, wherein the first physical layer circuit is configured to receive and demodulate a packet from a transmitter device, to acquire a first value of at least one indicator associated with the packet; and
a second receiver device comprising a second physical layer circuit, wherein the second physical layer circuit is configured to receive and demodulate the packet, to acquire a second value of the at least one indicator associated with the packet,
wherein based on the first value and the second value, it is determined whether the packet is an abnormal packet or not,
wherein if the packet is the abnormal packet, the first physical layer circuit and the second physical layer circuit drop the packet,
wherein if a difference between the first value and the second value is greater than a threshold value, it is determined that the packet is the abnormal packet.

10. The receiver system of claim 9, wherein if the first value or the second value is less than a threshold value, it is determined that the packet is the abnormal packet.

11. An operation method, comprising:
receiving a packet by a receiver device;
demodulating the packet to acquire a first value of at least one indicator associated with the packet by a physical layer circuit of the receiver device at a first timing;
acquiring a second value of the at least one indicator at a second timing by the physical layer circuit;
acquiring a first difference value between the first value and the second value by the physical layer circuit;
determining whether the packet is an abnormal packet or not based on the first difference value and a first threshold value by the physical layer circuit; and
dropping the packet by the physical layer circuit if the packet is the abnormal packet.

12. The operation method of claim 11, wherein determining whether the packet is the abnormal packet or not based on the first difference value and the first threshold value by the physical layer circuit comprises:
if the first difference value is greater than the first threshold value, determining that the packet is the abnormal packet by the physical layer circuit; and
if the first difference value is equal to or less than the first threshold value, determining that the packet is a normal packet the physical layer circuit.

13. The operation method of claim 11, wherein determining whether the packet is the abnormal packet or not according to the at least one indicator by the physical layer circuit further comprises:
if the physical layer circuit determines that the packet is a normal packet, acquiring a third value of the at least one indicator at a third timing by the physical layer circuit;
calculating a second difference value between the third value and the second value by the physical layer circuit; and
determining whether the packet is still the normal packet or no based on the second difference value and the first threshold value by the physical layer circuit.

14. The operation method of claim 13, wherein determining whether the packet is still the normal packet or no based on the second difference value and the first threshold value by the physical layer circuit comprises:
if the second difference value is greater than the first threshold value, determining that the packet is the abnormal packet by the physical layer circuit; and
if the second difference value is equal to or less than the first threshold value, determining that the packet is still the normal packet by the physical layer circuit.

15. The operation method of claim 11, wherein determining whether the packet is the abnormal packet or not according to the at least one indicator by the physical layer circuit further comprises:
if the packet is a normal packet, acquiring a third value of the at least one indicator at a third timing by the physical layer circuit;
calculating a second difference value between the third value and the second value by the physical layer circuit; and
comparing the second difference value with a second threshold value by the physical layer circuit, to determine whether the packet is still the normal packet or not.

16. The operation method of claim 15, wherein comparing the second difference value with the second threshold value by the physical layer circuit to determine whether the packet is the abnormal packet or not comprises:

if the second difference value is greater than the second threshold value, determining that the packet is the abnormal packet by the physical layer circuit; and if the second difference value is equal to or less than the second threshold value, determining that the packet is still the normal packet by the physical layer circuit.

17. The operation method of claim 11, wherein the at least one indicator comprises a received signal strength indication, a carrier frequency offset, a signal-to-noise ratio, a summation value of Barker code, an error vector magnitude, or a guard interval.

* * * * *